G. COMADA.
ANIMAL-TRAPS.

No. 195,703. Patented Oct. 2, 1877.

WITNESSES:
R. S. Reeves
Nat. E. Oliphant

INVENTOR:
George Comada
BY C. H. Fowler,
ATTORNEY.

UNITED STATES PATENT OFFICE.

GEORGE COMADA, OF BALTIMORE, MARYLAND.

IMPROVEMENT IN ANIMAL-TRAPS.

Specification forming part of Letters Patent No. 195,703, dated October 2, 1877; application filed August 11, 1877.

*To all whom it may concern:*

Be it known that I, GEORGE COMADA, of Baltimore, in the county of Baltimore and State of Maryland, have invented a new and valuable Improvement in Animal-Traps; and I do hereby declare that the following is a full, clear, and exact description of the construction and operation of the same, reference being had to the annexed drawings, making a part of this specification, and to the letters and figures of reference marked thereon.

Figure 1:
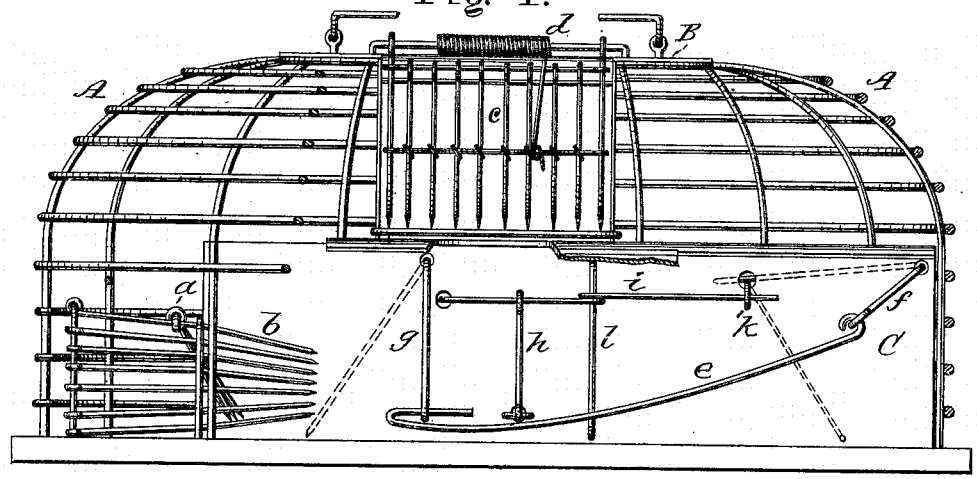
Figure 2:
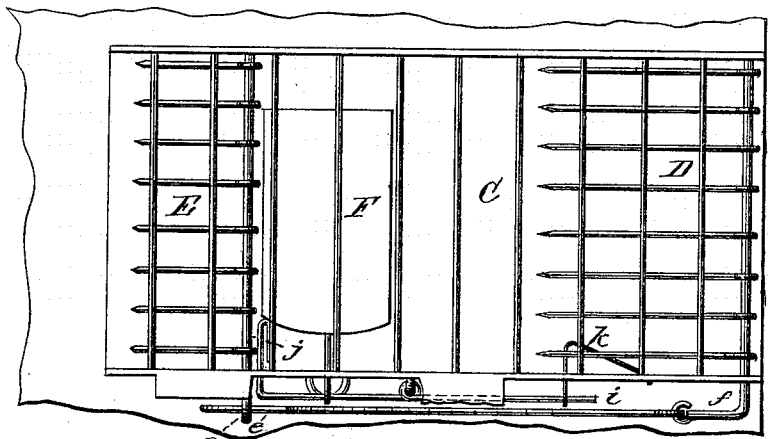
Figure 3:
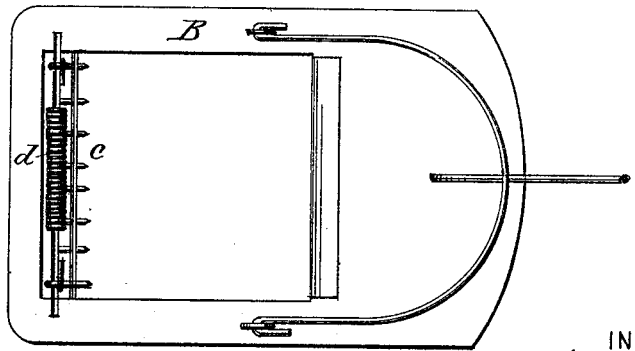

Figure 1 of the drawing is a representation of a side elevation of my invention, with a portion of the wire body removed. Fig. 2 is a plan view of the interior. Fig. 3 is a detached plan view of the box.

This invention has relation to cage-traps for animals; and consists in two or more hinged gates, the same being connected to a series of levers by which the trap will be always set and ready for the next victim, the gates being operated by a bait-lever or by a pivoted platform, which the animal depresses in attempting to reach the bait, which may be placed on the end of the bait-lever or upon the platform, or, if desired, upon both of them.

The invention further consists of the general construction and arrangement of the several parts composing the trap, which will be hereinafter described, and subsequently pointed out in the claims.

In the accompanying drawings, A is the trap-body, formed of wire-netting, and is provided with a suitable door for the removal of the rats or other animals from the trap. The body A has an entrance-opening, provided with a swinging gate, *a*, said opening being surrounded by inwardly-projecting pointed wires *b*, to prevent the animal from escaping. Upon the top of the body A is an opening, into which fits a three-sided box, B, open at top and bottom. One side of this box is formed by a wire gate, *c*, kept automatically closed by a spring, *d*, which allows the animal to enter the trap from the top. The box is held within the body A by any suitable means, in such a manner as will admit of the removal of the same when found necessary to obtain access to the interior of the body to repair the trap or for other purposes.

Within the body A is formed a passage-way, C, to each end of which is pivoted a gate, D E. These gates operate in connection with each other by the rod *e*, the ends of which are connected to crank-arms *f g* of the gates.

Between the two gates D E is a tilting platform, F, connected to an upright arm, *h*, upon the outside of the passage-way, said arm, upon its upper end, receiving a horizontal rod, *i*. One end of this rod passes into the passage-way directly over the platform F, and has thereon a bait-hook, *j*. The rod *i*, at its other end, connects with a wire catch, *k*, and is secured near its center to an upright rod, *l*, upon which it swings. If desired, a plate may be used to cover the above operating mechanism, so as to protect it from injury by the animals.

In operation, the rat or other animal passes under the gate D, which is raised sufficiently to allow the animal to pass into the compartment or passage-way. It is now supposed that the hook *j* and platform F are properly baited. As the animal steps upon the platform and passes to its farther end the arm *g*, to which the platform is attached, is brought in a direction toward said platform, which in turn throws the end of the horizontal rod *i* outward, taking the wire catch *k* with it, and thereby removing the support from the gate D, which will cause it to fall by its own weight, and close the entrance of the passage-way. The animal, desirous of gaining its liberty, passes onward in its course, and by its natural strength pushes the gate E up sufficiently to pass underneath it into the cage or body A. As the gate is forced up, the crank-rod *g* is thrown back, and by its connection with the gate D, through the rod *e* and crank-arm *f*, the gate D is raised until it rests upon the wire catch *k*. If the animal should hesitate to go beyond the platform, the bait upon the hook *j* will attract his attention, and will have the same purpose of closing the gate D.

Having now fully described my invention, what I claim as new, and desire to secure by Letters Patent, is—

1. The gates D E, provided with crank-arms *f g*, in combination with the rod *e*, tilting platform F, arm *h*, horizontal rod *i*, catch $k$, constructed to operate substantially as and for the purpose set forth.

2. The cage or body A, with entrance-opening provided with a gate, $a$, and the removable box B, having gate $c$, and the gates D E, with their operating mechanism, substantially as and for the purpose specified.

In testimony that I claim the above I have hereunto subscribed my name in the presence of two witnesses.

GEORGE ×̇ COMADA.
         mark.

Witnesses:
 NAT. E. OLIPHANT,
 D. M. HOWARD.